US008455585B2

(12) United States Patent
Greene et al.

(10) Patent No.: US 8,455,585 B2
(45) Date of Patent: Jun. 4, 2013

(54) WATER REPELLANT COMPOSITIONS AND COATINGS

(75) Inventors: James D. Greene, Adrian, MI (US); Danielle Haeussler, Tecumseh, MI (US)

(73) Assignee: Wacker Chemical Corporation, Adrian, MI (US)

( * ) Notice: Subject to any disclaimer, the term of this patent is extended or adjusted under 35 U.S.C. 154(b) by 723 days.

(21) Appl. No.: 11/939,848

(22) Filed: Nov. 14, 2007

(65) Prior Publication Data

US 2008/0125536 A1 May 29, 2008

Related U.S. Application Data

(60) Provisional application No. 60/858,980, filed on Nov. 14, 2006.

(51) Int. Cl.
*C08L 83/00* (2006.01)

(52) U.S. Cl.
USPC ............... 524/506; 106/2; 106/244; 524/804

(58) Field of Classification Search
USPC ....................................................... 524/804
See application file for complete search history.

(56) References Cited

U.S. PATENT DOCUMENTS

| | | | |
|---|---|---|---|
| 3,861,939 A * | 1/1975 | Merrill et al. ................. | 427/387 |
| 4,443,437 A * | 4/1984 | Prokosch et al. ............. | 514/560 |
| 4,741,773 A | 5/1988 | Kuroda et al. | |
| 5,300,327 A | 4/1994 | Stark-Kasley et al. | |
| 5,695,551 A * | 12/1997 | Buckingham et al. ............ | 106/2 |
| 5,736,619 A * | 4/1998 | Kane et al. ..................... | 525/393 |
| 6,149,148 A | 11/2000 | Zahn et al. | |
| 6,258,881 B1 * | 7/2001 | Moritomi ....................... | 524/267 |
| 6,344,520 B1 | 2/2002 | Greene | |
| 6,541,562 B1 * | 4/2003 | Aoki et al. ..................... | 524/588 |
| 6,713,586 B2 | 3/2004 | Greene | |
| 6,743,854 B2 * | 6/2004 | Yeats et al. ..................... | 524/731 |
| 7,053,026 B2 | 5/2006 | Li | |
| 7,118,621 B2 * | 10/2006 | Gerritsen et al. ........ | 106/287.13 |
| 7,129,310 B2 | 10/2006 | Greene et al. | |
| 2002/0156187 A1 | 10/2002 | Greene | |
| 2003/0099603 A1 | 5/2003 | Rajaiah et al. | |
| 2003/0139541 A1 | 7/2003 | Nixon | |
| 2003/0224157 A1 | 12/2003 | Matthews et al. | |
| 2005/0136267 A1 * | 6/2005 | Greene et al. ................. | 428/447 |
| 2005/0154170 A1 | 7/2005 | Klaassens et al. | |
| 2005/0202257 A1 | 9/2005 | Gerritsen et al. | |
| 2005/0227093 A1 | 10/2005 | Nixon | |
| 2006/0079620 A1 | 4/2006 | Greene et al. | |
| 2007/0021579 A1 | 1/2007 | Greene et al. | |

FOREIGN PATENT DOCUMENTS

WO    WO 03/093350    * 11/2003

OTHER PUBLICATIONS

Hawley's Condensed Chemical Dictionary, 12th edition, pp. 930-931, 1993.*

* cited by examiner

*Primary Examiner* — Doris Lee

(74) *Attorney, Agent, or Firm* — Brooks Kushman P.C.

(57) ABSTRACT

In at least one embodiment the present invention relates to a water repellant coating composition comprising an organic polymer, polysiloxane, an emulsifier, and water. In at least one embodiment, the organic polymer comprises polybutene, an alkyd polymer, an acrylic polymer, or a mixture thereof.

19 Claims, No Drawings

# WATER REPELLANT COMPOSITIONS AND COATINGS

CROSS-REFERENCE TO RELATED APPLICATIONS

This application claims the benefit of U.S. provisional application Ser. No. 60/858,980 filed Nov. 14, 2006, which is incorporated herein by reference.

BACKGROUND OF THE INVENTION

1. Field of the Invention

The present invention relates to water repellant coating compositions, coatings made from the coating compositions, products coated by the coatings, and methods for making the same.

2. Background

Construction materials based on cellulosic and masonry substrates can be subject to damage by moisture after being exposed to the exterior environment. For example, moisture penetration into wood substrates can cause these materials to expand, widening cracks and finally causing deterioration to the structure of the panel due to volume changes resulting from water freezing and thawing during winter and summer months. In addition, water is essential for microbial attack (i.e., fungi, moss, lichen, etc.). Moisture content of 20% or greater in the wood can accelerate the breakdown of wood substrates. Masonry substrates can suffer the same type of degradation due to freeze/thaw resulting in what is known as sprawling and cracking.

Water repellant compositions for cellulosic materials, such as wood substrates, masonry substrates, and other substrates, are well known. The protection of substrates made of such types of materials initially used organic polymers (such as linseed oil) which were thought to protect the substrate from water. Advances in organic polymer synthesis pushed the technology to more crosslinkable polymers such as alkyds and acrylic technologies.

The addition of wax was thought to aid in water repellency due to increased beading on the substrate; however this protection tends to typically be short term when these substrates are placed in the presence of UV light, heat and moisture.

The modification of organic polymers with silicone is a way of extending durability by increasing hydrophobicity over a longer period of time. The high energy Si—O—Si bond on silicone makes it resistant to UV light and heat associated with exterior exposure. The low surface energy and increased hydrophobic surface make silicone ideal for increasing water repellency. Typical silicone polymers have a tendency to migrate to the surface of organic based coatings and wear away.

Silicone polymers which have non- or low reactivity or are based on a high dimethyl content tend to have a propensity to separate. The modification of the silicone/silane with organic substituents such as $C_3$-$C_8$ or phenyl type are more compatible with organic polymers and are less likely to migrate. The use of monomeric materials such as silanes have been used in the past with high alkoxy contents. These materials work well for increasing water repellency, however due to the alkoxy content they have an increased VOC which make them more difficult to use.

Different states have adopted regulations such as South Coast Air Quality Management District (SCAQMD) Rule 1113, which are more aggressive at reducing VOC than EPA regulations. It would be desirable to proved waterborne, low VOC, water repellents for cellulosic and masonry substrates, as well as other substrates, which meet and exceed these regulations.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. However, it is to be understood that the disclosed embodiments are merely exemplary of the invention that may be embodied in various and alternative forms. Therefore, specific details disclosed herein are not to be interpreted as limiting, but merely as a representative bases for the claims and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; and the first definition of an acronym or other abbreviation applies to all subsequent uses herein of the same abbreviation and applies mutatis mutandis to normal grammatical variations of the initially defined abbreviation.

In at least one embodiment, the present invention relates to a water repellant coating composition comprising an organic polymer, polysiloxane, an emulsifier and water. In certain embodiments, the organic polymer can be polybutene, an alkyd polymer, and/or an acrylic.

In at least one embodiment, the present invention relates to a water repellant coating composition comprising polybutene, polysiloxane, an emulsifier and water. In at least one embodiment, the water repellant composition comprises, based on the total weight of the composition, 10-70 weight percent polybutene, 3.5-40 weight percent polysiloxane, 0.5-15 weight percent emulsifier, and 15-80 weight percent water. In at least another embodiment, the water repellant composition comprises, based on the total weight of the composition, 25-45 weight percent polybutene, 7.5-20 weight percent polysiloxane, 1-7.5 weight percent emulsifier, and 35-60 weight percent water.

The components are present in the water repellant composition in at least one embodiment, in at least another embodiment, and in yet at least another embodiment in the following amounts, based on the total weight of the composition:

| Component | one embodiment (wt. %) | another embodiment (wt. %) | yet another embodiment (wt. %) |
|---|---|---|---|
| polybutene | 10-70 | 25-45 | 35.12 |
| polysiloxane | 3.5-40 | 7.5-20 | 11.63 |
| emulsifier | 0.5-15 | 1-7.5 | 3.99 |
| biocide | 0-2 | 0.01-0.25 | 0.07 |
| Water | 15-80 | 35-60 | 47.08 |

In at least one embodiment, the emulsifier comprises a fatty acid, such as oleic acid. In another embodiment, the emulsifier further comprises triethanol amine. In certain embodiments, the fatty acid may comprise a mixture of fatty acids. In at least one embodiment, the water repellant composition further comprises one or more biocides and/or other typical components such as surfactants, pigments, fillers, extenders, stabilizers, dispersants, etc.

When the emulsifier is a fatty acid, the components are present in the water repellant composition in at least one embodiment, in at least another embodiment, and in yet at least another embodiment in the following amounts, based on the total weight of the composition:

| Component | one embodiment (wt. %) | another embodiment (wt. %) | yet another embodiment (wt. %) |
|---|---|---|---|
| polybutene | 10-70 | 25-45 | 35.12 |
| polysiloxane | 3.5-40 | 7.5-20 | 11.63 |
| fatty acid | 0.5-15 | 1-7.5 | 3.99 |
| triethanol amine | 0-12 | 1-6 | 2.11 |
| biocide | 0-2 | 0.01-0.25 | 0.07 |
| Water | 15-80 | 35-60 | 47.08 |

It should be understood that one or more reactions may take place after the components interact with each other. In at least one embodiment where oleic acid and triethanol amine are present, it is believed that at least some of the oleic acid and triethanol amine react with each other to form triethanolamine oleate salt. In at least one embodiment, at least 50% of the oleic acid and triethanol amine react with each other to form triethanolamine oleate salt, in at least another embodiment, at least 75% of the oleic acid and triethanol amine react with each other to form triethanolamine oleate salt, in yet another embodiment, at least 90% of the oleic acid and triethanol amine react with each other to form triethanolamine oleate salt, and in still yet another embodiment, 100% of the oleic acid and triethanol amine react with each other to form triethanolamine oleate salt.

In at least another embodiment, the water repellant composition further comprises wax. When wax is present, the components are present in the water repellant composition in at least one embodiment, in at least another embodiment, and in yet at least another embodiment in the following amounts, based on the total weight of the composition:

| Component | one embodiment (wt. %) | another embodiment (wt. %) | yet another embodiment (wt. %) |
|---|---|---|---|
| polybutene | 5-55 | 15-45 | 28.09 |
| polysiloxane | 3-35 | 5-20 | 9.3 |
| fatty acid | 0.5-15 | 1-7.5 | 3.19 |
| triethanol | 0.25-12 | 0.5-6 | 1.69 |

-continued

| Component | one embodiment (wt. %) | another embodiment (wt. %) | yet another embodiment (wt. %) |
|---|---|---|---|
| amine | | | |
| biocide | 0-1 | 0.01-0.25 | 0.07 |
| wax[1] | 5-40 | 10-30 | 20 |
| Water | 10-70 | 25-50 | 37.66 |

[1]The wax is provided in a 34.5 to 35.5 weight percent.

While any suitable emulsifier can be used, it should be noted that in certain embodiments, the emulsifier comprises a fatty acid, either alone or in combination with triethanol amine.

The compositions can be prepared in any suitable manner. In at least one embodiment, the polybutene and the polysiloxane are mixed together on low shear i.e, around 1000 rpm. The emulsifier is then added while mixing is continued on low shear. If the emulsifier comprises oleic acid and triethanolamine they are then added together while mixing is continued on low shear. The shear is increased to high shear and the water is slowly added. After most of the water has been added, the shear is decreased as the remainder of the water is continued to be added. If present, the biocide is then added and mixing is continued until homogenous. If wax is present, the wax can be added at the same time as the biocide.

Any suitable polysiloxane having a dimethyl content or a relatively high functionality may be used. The manner of making such polysiloxanes are well known. Suitable polysiloxanes include, but are not limited to, polysiloxanes having a dimethyl content of less than 90 wt. %, based on the total weight of the polysiloxane, in another embodiment of 10 to 85 wt. %, and in yet another embodiment of 20 to 50 wt. %. Suitable polysiloxanes may also include, but are not limited to, polysiloxanes having a functionality of at least 0.25 wt. %, based on the total weight of the polysiloxane, in another embodiment of 3 to 25 wt. %, and in yet another embodiment of 7.5 to 17.5 wt. %. The functionality could be provided as alkoxy, silanol, phenoxy, glycidoxy and/or amine.

In at least one embodiment, suitable polysiloxanes include polysiloxanes of formula (I):

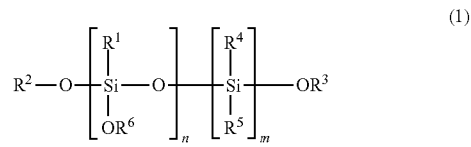

wherein each $R^1$, $R^4$, and $R^5$ may be identical or different and are independently selected from the group comprising alkyl, aryl, aminoalkyl, mercaptoalkyl, glycidyl ether alkyl, and hydrogen radicals, $R^2$, $R^3$, and $R^6$ may be identical or different and are selected each independently from the group comprising hydrogen, alkyl and aryl radicals, and m and n is selected so that the molecular weight for the polysiloxane is in the range of from 200 to 600,000.

In certain embodiments, suitable polysiloxane of formula (I) may have a molecular weight ranging from 200 to 600,000, and in other embodiments from 500 to 6000, and in yet other embodiments of 750 to 2200. In at least certain embodiments, suitable polysiloxanes of formula (1) may have an alkoxy content of at least 0.25 wt. %, based on the total weight of the polysiloxane, in another embodiment of 3 to 25 wt. %, and in yet another embodiment of 7.5 to 19.5 wt. %. In at least other embodiments, suitable polysiloxanes of formula (I) may have an silanol content of at least 0.25 wt. %, based on the total weight of the polysiloxane, in another embodiment of 3 to 25 wt. %, and in yet another embodiment of 7.5 to 19.5 wt. %.

Certain examples of suitable polysiloxane of formula (1) include but are not limited to the alkoxy- and silanol-functional polysiloxanes. Suitable alkoxy-functional polysiloxanes include, but are not limited to: DC-3074 and DC3037 from Dow Corning; Silres SY-550, and SY-231 from Wacker Silicone; and Rhodorsil Resin 10369 A, Rhodorsil 48V750, 48V3500 from Rhodia Silicones; and SF1147 from General Electrics. Suitable silanol-functional polysiloxanes include, but are not limited to, Silres SY 300, Silres SY 440, Silres MK and REN 168 from Wacker Silicone, Dow Corning's DC-840, DC233 and DC-431 HS silicone resins and DC-Z-6018 intermediate and Rhodia Silicones' Rhodorsil Resin 6407 and 6482 X.

In at least one embodiment, a particularly preferred polysiloxane is a silicone which comprises of ~10 to 100% (phenyl silane-P1) and ~0 to 90% (dimethyl silane-M2). In at least one embodiment, a particularly preferred polysiloxane is a silicone which comprises ~60% (phenyl silane-P1) and ~40% (dimethyl silane-M2).

In at least one embodiment, suitable silicones will have ~0.25 to 50% methoxy functionality and ~0 to 12.5% butoxy functionality. In at least another embodiment, suitable silicones will have ~12% methoxy functionality and ~3% butoxy functionality.

It should be understood that in at least one embodiment, that suitable silicones can be made from chlorosilane, however an equal product could be made from alkoxy silane. Examples of certain suitable silicones and the manner of making them can be found in U.S. Patent Application Publication Nos. 2002/0156187, 2005/0136267, 2006/0079620, and 2007/0021579, and U.S. Pat. Nos. 6,344,520, 6,713,586, and 7,129,310 which are incorporated herein by reference.

The range of methoxy could be 0 to 50% and the range for butoxy could be 0 to 50%. In at least one embodiment, the range of the silicone composition could be 10 to 100% phenyl silane and 0 to 90% methyl silane. In at least one embodiment, the range of the silicone composition could be 10 to 80% phenyl silane and 20 to 90% methyl silane. However, it is to be understood that the organic substituents are not limited to phenyl or methyl substituents, let alone the ranges described above. It is contemplated that the octyl ($C_8$), butyl and/or propyl substituent will work as well for replacing either the phenyl or methyl substitutents, in addition to the phenyl or methyl and/or substituents. In addition, the amino alkyl or aminoethylamino alkyl or cyclalkyl amino alkyl may also be suitable functional groups to help with adhesion and long term durability. The alkoxy functionality should not be critical and it is contemplated that there is a possibility of using silanol functional products or carbinol functional products. It is contemplated that the addition of this product to water in the presence of alkaline materials may cause some homopolymerization and/or the hydrolisys of the alkoxy to form silanol groups.

Any suitable polybutene can be used. In at least one embodiment, the polybutene can be any of the available polybutene with a number average molecular weight between about 150 and 4,000, and in other embodiments of 900 to 3,000. One such polybutene is Innovene Indopol H-300 oil having a number average molecular weight of about 1330, used in the examples below. While these are characterized as polybutene they may have up to 10 or 15 wt. % of repeating units from other monomers and fragments of polymerization initiators and terminators. Desirably the residue of at least 85 to 90 wt. % of the repeating units are derived from polymerizing butene, such as isobutene.

It is contemplated that polybutene could be substituted in whole or in part with potentially any organic oil-modified polymer. We suspect alkyd polymers and acrylic based polymers may work as a potential replacement.

It is contemplated that the oleic acid could be substituted in whole or in part with other fatty acid emulsifiers of different chain lengths; and non-ionic alkyl, ethyleneoxide based emulsifiers. As such, it is anticipated that both or either anionic and non-ionic emulsifiers could be used. It is also anticipated that certain suitable surfactants could be used, such as a fatty alcohol polyglycolether. One suitable surfarctant comprises an alpha-1-tridecyl-omega-hydroxypolyglycolether.

It is contemplated that the triethanol amine could be substituted in whole or in part with diethaynol amine, ethanol amine, or any alkyl amine, arylamine, potassium hydroxide, sodium hydroxide, ammonium hydroxide, or alkaline material. As such, it is anticipated that any suitable alkaline material could be used.

It is contemplated that any suitable biocide could be used. One such suitable biocide includes water soluble biocides.

Suitable waxes include polyethylene waxes, polypropylene waxes, paraffin waxes, polytetrafluoroethylene waxes, silicone waxes, and mixtures thereof. In one embodiment, the aqueous composition contains an oxidized polyolefin wax, such as prepared by the process disclosed in U.S. Pat. No. 6,169,148 B1. The waxes may be provided as emulsions such as anionic wax emulsions, nonionic polyethylene emulsions, nonionic paraffin emulsions, and anionic paraffin/polyethylene emulsions or as powders such as polyethylene powder and modified synthetic wax powder. A preferred wax is anionic paraffin/polyethylene emulsion.

In certain relatively broad embodiments, the water repellant composition of the present invention comprises:

| Component | one embodiment (wt. %) | another embodiment (wt. %) | yet another embodiment (wt. %) |
|---|---|---|---|
| oil-modified polymer | 10-70 | 25-45 | 30-40 |
| polysiloxane | 3.5-40 | 7.5-20 | 10-14 |
| emulsifier | 0.5-15 | 1-7.5 | 2-5 |
| alkaline material | 0.0-12 | 1-6 | 1.75-4 |
| biocide | 0-2 | 0.01-0.25 | 0.05-0.15 |
| Water | 15-80 | 35-60 | 42.5-52.5 |

In certain other relatively broad embodiments, the water repellant composition of the present invention comprises:

| Component | one embodiment (wt. %) | another embodiment (wt. %) | yet another embodiment (wt. %) |
|---|---|---|---|
| acrylic polymer | 10-70 | 25-45 | 30-40 |
| polysiloxane | 3.5-40 | 7.5-20 | 10-14 |
| emulsifier | 0.5-15 | 1-7.5 | 2-5 |
| alkaline material | 0.0-12 | 1-6 | 1.75-4 |
| biocide | 0-2 | 0.01-0.25 | 0.05-0.15 |
| Water | 15-80 | 35-60 | 42.5-52.5 |

In still certain other relatively broad embodiments, the water repellant composition of the present invention comprises:

| Component | one embodiment (wt. %) | another embodiment (wt. %) | yet another embodiment (wt. %) |
|---|---|---|---|
| oil-modified polymer | 5-55 | 15-45 | 25-35 |
| polysiloxane | 3-35 | 5-20 | 7.5-15 |
| emulsifier | 0.5-15 | 1-7.5 | 2-5 |
| alkaline material | 0.0-12 | 0.5-6 | 1-3 |
| biocide | 0-1 | 0.01-0.25 | 0.05-0.15 |
| wax[2] | 5-40 | 10-30 | 15-25 |
| Water | 10-70 | 25-50 | 32.5-42.5 |

[2]The wax is provided in a 34.5-35.5 weight percent emulsion.

In still yet certain other broad embodiments, the water repellant composition of the present invention comprises:

| Component | one embodiment (wt. %) | another embodiment (wt. %) | yet another embodiment (wt. %) |
|---|---|---|---|
| acrylic polymer | 5-55 | 15-45 | 25-35 |
| polysiloxane | 3-35 | 5-20 | 7.5-15 |
| emulsifier | 0.5-15 | 1-7.5 | 2-5 |
| alkaline material | 0.0-12 | 0.5-6 | 1-3 |
| biocide | 0-1 | 0.01-0.25 | 0.05-0.15 |
| wax[3] | 5-40 | 10-30 | 15-25 |
| Water | 10-70 | 25-50 | 32.5-42.5 |

[3]The wax is provided in a 34.5-35.5 weight percent emulsion.

In at least another embodiment, the water repellant composition of the present invention comprises:

| Component | (wt. %) |
|---|---|
| polybutene | 35.12 |
| polysiloxane | 11.63 |
| oleic acid | 3.99 |
| triethanol amine | 2.11 |
| Mergal 192[4] (biocide) | 0.07 |
| Water | 47.08 |

[4]Available from Troy Corporation.

In at least yet another embodiment, the water repellant composition of the present invention comprises:

| Component | (wt. %) |
|---|---|
| polybutene | 28.09 |
| polysiloxane | 9.3 |
| oleic acid | 3.19 |
| triethanol amine | 1.69 |
| Mergal 192[5] (biocide) | 0.07 |
| wax[6] | 20 |
| Water | 37.66 |

[5]Available from Troy Corporation.
[6]The wax is provided in a 34.5 to 35.5 weight percent emulsion.

In at least one embodiment, the water repellant compositions can be used as a water repellant coating for masonry and cellulosic substrates. In at least another embodiment, the water repellant compositions can be used as a water repellant additive in other compositions such as stains, masonry coatings, and paints. In these embodiments, the water repellant compositions are present in the other compositions in an amount of 1 to 25 weight percent, based on the total weight of the composition, in other embodiments of 1 to 25 weight percent, based on the total weight of the composition, and in yet other embodiments of 1 to 25 weight percent, based on the total weight of the composition. Compositions including the water repellant compositions of the present invention can be made of any suitable components and by any suitable method.

Compositions employing the water repellant compositions of the present invention can be made by those skilled in the art.

Having generally described this invention, a further understanding can be obtained by reference to certain specific examples which are provided herein for purposes of illustration only and are not intended to be limiting unless otherwise specified.

EXAMPLES

Water repellant compositions of the formulas listed below are made in the manner similar to that identified above. Some of the compositions results in stable water repellant compositions having VOCs of less than 50 g/L as measured by EPA method No. 24. The compositions can be used as clear water repellants or they can be used as additives in stains and masonry compositions.

| Example 1 Ingredients | Amount (grams) |
|---|---|
| Water | 9.2976 |
| Non-ionic Surfactant | 7.7 |
| 80% Phenyl Methyl Siliconie Resin in Xylene | 61.85 |
| Polybutene | 61.85 |
| Water | 109.1599 |
| AmineBiocide | 0.11 |
| Total | 249.9675 |

| Example 2 Ingredients | Amount (grams) |
|---|---|
| Water | 9.2976 |
| Non-ionic Surfactant, | 7.7 |
| 80% Phenyl Methyl Silicone Resin in Xylene | 92.775 |
| Polybutene | 30.925 |
| Water | 109.1599 |
| Amine Biocide | 0.11 |
| Total | 249.9675 |

| Example 3 Ingredients | Amount (grams) |
|---|---|
| Water | 9.2976 |
| Non-ionic Surfactant | 7.7 |
| 80% Phenyl Methyl Resin in Xylene | 30.925 |
| Polybutene | 92.775 |
| Water | 109.1599 |
| Amine Biocide | 0.11 |
| Total | 249.9675 |

| Example 4 Ingredients | Amount (grams) |
|---|---|
| Water | 9.2976 |
| Non-ionic Surfactant | 7.7 |
| 80% Phenyl Methyl Silicone Resin in Xylene | 55.665 |
| Epoxy Phenyl Methyl siloxane | 6.185 |
| Polybutene | 61.859 |
| Water | 109.1599 |
| Amine Biocide | 0.11 |
| Total | 249.9765 |

| Example 5 Ingredients | Amount (grams) |
|---|---|
| Water | 9.2976 |
| Non-ionic Surfactant | 7.7 |
| Epoxy phenyl methyl siloxane | 12.37 |
| Polybutene | 111.33 |
| Water | 109.1599 |
| Amine Biocide | 0.11 |
| Total | 249.9675 |

| Example 6 Ingredients | Amount (grams) |
|---|---|
| Water | 9.2976 |
| Non-ionic Surfactant | 7.7 |
| Phenyl methyl Siloxane | 30.925 |
| Polybutene | 92.775 |
| Water | 109.1599 |
| AmineBiocide | 0.11 |
| Total | 249.9675 |

| Example 7 Ingredients | Amount (grams) |
|---|---|
| Water | 9.2976 |
| Non-ionic Surfactant | 7.7 |
| Phenyl methyl Siloxane | 12.37 |
| Polybutene | 111.33 |
| Water | 109.1599 |
| Amine Biocide | 0.11 |
| Total | 249.9675 |

| Example 8 Ingredients | Amount (grams) |
|---|---|
| Water | 9.2976 |
| Non-ionic Surfactant | 7.7 |
| Phenyl methyl Siloxane | 55.665 |
| Epoxy phenyl methyl siloxane | 6.185 |
| Polybutene | 61.859 |
| Water | 109.1599 |
| Amine Biocide | 0.11 |
| Total | 249.9765 |

| Example 9 Ingredients | Amount (grams) |
|---|---|
| Water | 5.5785 |
| Non-ionic Surfactant | 4.62 |
| Octyl Silane | 37.11 |
| Polybutene | 37.11 |
| Water | 65.496 |
| Amine Biocide | 0.044 |
| Total | 149.9585 |

| Example 10 Ingredients | Amount (grams) |
|---|---|
| Water | 5.5785 |
| Non-ionic Surfactant | 4.62 |
| Octyl Silane | 3.711 |
| Phenyl methyl Siloxane | 33.39 |
| Polybutene | 37.11 |
| Water | 65.496 |
| Amine Biocide | 0.044 |
| Total | 149.9495 |

| Example 11 Ingredients | Amount (grams) |
|---|---|
| Water | 5.5785 |
| Non-ionic Surfactant | 4.62 |
| Phenyl methyl Siloxane | 37.11 |
| Polybutene | 37.11 |
| Water | 65.496 |
| Amine Biocide | 0.044 |
| Total | 149.9585 |

| Example 12 Ingredients | Amount (grams) |
|---|---|
| Water | 6.4 |
| Non-ionic Surfactant | 50 |
| Octyl Silane | 7.5 |
| Phenyl methyl Siloxane | 7.5 |
| Polybutene | 15 |
| Water | 73.6 |
| 35% Wax emulsion | 40 |
| Amine Biocide | 0.06 |
| Total | 200.06 |

| Example 13 Ingredients | Amount (grams) |
|---|---|
| Water | 7.438 |
| Non-ionic Surfactant | 6.16 |
| 80% Phenyl Methyl Silicone Resin in Xylene | 49.48 |
| Polybutene | 49.48 |
| Water | 87.32 |
| Amine Biocide | 0.11 |
| 35% Wax emulsion | 50 |
| Total | 249.988 |

| Example 14 Ingredients | Amount (grams) |
|---|---|
| Water | 7.43808 |
| Non-ionic Surfactant | 6.16 |
| 80% Phenyl Methyl Silicone Resin in Xylene | 74.22 |
| Polybutene | 24.74 |
| Water | 87.32792 |
| Amine Biocide | 0.088 |
| 35% Wax emulsion | 50 |
| Total | 249.974 |

| Example 15 Ingredients | Amount (grams) |
|---|---|
| Water | 7.43808 |
| Non-ionic Surfactant | 6.16 |
| 80% Phenyl Methyl Silicone Resin in Xylene | 24.74 |
| Polybutene | 74.22 |
| Water | 87.32792 |
| Amine Biocide | 0.088 |
| 35% Wax emulsion | 50 |
| Total | 249.974 |

| Example 16 Ingredients | Amount (grams) |
|---|---|
| Water | 7.43808 |
| Non-ionic Surfactant | 6.16 |
| 80% Phenyl Methyl Silicone Resin in Xylene | 44.532 |
| Epoxy phenyl methyl siloxane | 4.948 |
| Polybutene | 49.4872 |
| Water | 87.32792 |
| Amine Biocide | 0.088 |
| 35% Wax emulsion | 50 |
| Total | 249.9812 |

| Example 17 Ingredients | Amount (grams) |
|---|---|
| Water | 7.438 |
| Non-ionic Surfactant | 6.16 |
| Epoxy phenyl methyl siloxane | 9.896 |
| Polybutene | 89.064 |
| Water | 87.32 |
| Amine Biocide | 0.11 |
| 35% Wax emulsion | 50 |
| Total | 249.988 |

| Example 18 Ingredients | Amount (grams) |
|---|---|
| Water | 7.43808 |
| Non-ionic Surfactant | 6.16 |
| Phenyl methyl Siloxane | 24.74 |
| Polybutene | 74.22 |
| Water | 87.32792 |
| Amine Biocide | 0.088 |
| 35% Wax emulsion | 50 |
| Total | 249.974 |

| Example 19 Ingredients | Amount (grams) |
|---|---|
| Water | 7.43808 |
| Non-ionic Surfactant | 6.16 |
| Phenyl methyl Siloxane | 9.896 |
| Polybutene | 89.064 |
| Water | 87.32792 |
| Amine Biocide | 0.088 |
| 35% Wax emulsion | 50 |
| Total | 249.974 |

| Example 20 Ingredients | Amount (grams) |
|---|---|
| Water | 7.43808 |
| Non-ionic Surfactant | 6.16 |
| Phenyl methyl Siloxane | 44.532 |
| Epoxy phenyl methyl siloxane | 4.948 |
| Polybutene | 49.4872 |
| Water | 87.32792 |
| Amine Biocide | 0.088 |
| 35% Wax emulsion | 50 |
| Total | 249.9812 |

| Example 21 Ingredients | Amount (grams) |
|---|---|
| Water | 4.4628 |
| Non-ionic Surfactant[1] | 3.696 |
| Octyl Silane | 29.688 |
| Polybutene | 29.688 |

| Example 21 Ingredients | Amount (grams) |
|---|---|
| Water | 52.3968 |
| Amine Biocide | 0.0352 |
| 35% Wax emulsion | 30 |
| Total | 149.9668 |

| Example 22 Ingredients | Amount (grams) |
|---|---|
| Water | 4.4628 |
| Non-ionic Surfactant | 3.696 |
| Octyl Silane | 2.9688 |
| Phenyl methyl Siloxane | 26.712 |

| Example 23 Ingredients | Amount (grams) |
|---|---|
| Water | 4.4628 |
| Non-ionic Surfactant | 3.696 |
| Phenyl methyl Siloxane | 29.688 |
| Polybutene | 29.688 |
| Water | 52.3968 |
| Amine Biocide | 0.0352 |
| 35% Wax emulsion | 30 |
| Total | 149.9668 |

Water absorption is measured by using a modified version of DIN 52617 test method using wood. The sample is placed on a completely saturated sponge and water absorption is gravimetrically measured after a period of 24 hours. Water beading is a visual determination with (1=excellent, 5=bad). The results are shown in Tables 1 and 2 below at 0, 300, 1000, 1500, 2500, 3000 and 4000 hours.

TABLE 1

Represents water absorption (%) before and after UV exposure

| Example | Water abs 0 | QUV 300 | 1000 | 1500 | 2500 | 3000 | 4000 |
|---|---|---|---|---|---|---|---|
| 1 | 20.27533942 | 18.96545 | 20.63541 | 22.90722 | 21.96452 | 26.35837 | 28.48577 |
| 2 | 22.61143904 | 15.54264 | 19.52119 | 23.28485 | 22.93962 | 27.48326 | 30.41393 |
| 3 | | | | | | | |
| 4 | 20.00593369 | 15.46342 | 19.246 | 20.95792 | 21.84071 | 24.86172 | 27.40971 |
| 5 | 29.69494024 | 23.17167 | 23.02198 | 25.55417 | 25.04489 | 27.96568 | 32.53348 |
| 6 | 27.32893282 | 21.97405 | 20.48334 | 20.56974 | 20.90251 | 23.02794 | 26.98567 |
| 7 | 31.50877265 | 23.82495 | 23.70607 | 26.21769 | 25.05592 | 25.73691 | 29.31585 |
| 8 | 28.7647046 | 21.48478 | 18.45471 | 22.13182 | 21.30902 | 23.37955 | 27.09632 |
| 9 | 29.6210422 | 20.14167 | 20.62358 | 16.73493 | 17.63902 | 19.17403 | 26.03367 |
| 10 | 32.02130804 | 17.27828 | 17.97979 | 12.27444 | 17.49883 | 18.23553 | 20.99446 |
| 11 | 27.76554001 | 20.63532 | 25.69023 | 24.60021 | 25.49641 | 25.53319 | 31.05905 |
| 12 | 20.25967579 | 17.76108 | 21.2655 | 21.10296 | 21.23515 | 20.56019 | 24.51549 |
| 13 | 18.41590806 | 15.06325 | 13.67728 | 12.59504 | 13.6168 | 15.38231 | 18.0013 |
| 14 | 19.9301046 | 13.43773 | 14.17423 | 15.25698 | 15.69615 | 15.36423 | 20.15679 |
| 15 | | | | | | | |
| 16 | 17.73709128 | 14.28571 | 14.02822 | 14.26896 | 14.98474 | 15.71851 | 18.40264 |
| 17 | | | | | | | |
| 18 | 11.44583933 | 11.48802 | 14.05496 | 12.09123 | 14.83306 | 14.1158 | 16.28141 |
| 19 | 15.28944906 | 12.45712 | 13.05729 | 13.7573 | 12.68421 | 12.59841 | 16.07894 |
| 20 | | | | | | | |
| 21 | | | | | | | |
| 22 | | | | | | | |
| 23 | 13.99214326 | 11.75315 | 14.57737 | 12.80311 | 15.06289 | 14.81406 | 16.68649 |
| Untreated Wood | 36.99703558 | | | | | | |
| Wax emulsion without silicone applied at 5% | 41.3747843 | | | | | | |

| Example 22 Ingredients | Amount (grams) |
|---|---|
| Polybutene | 29.688 |
| Water | 52.3968 |
| Amine Biocide | 0.0352 |
| 35% Wax emulsion | 30 |
| Total | 149.9596 |

TABLE 2

Represents Beading before and after UV exposure
(1 = Excellent and 5 = Bad)

| Example | Beading 0 | QUV 300 | 1000 | 1500 | 2500 | 3000 | 4000 |
|---|---|---|---|---|---|---|---|
| 1 | 3.5 | 4 | 4 | 4 | 3.5 | 3 | 3.5 |
| 2 | 3.5 | 4 | 4 | 4 | 3.5 | 3 | 3.5 |
| 3 | | | | | | | |
| 4 | 2.5 | 4 | 4 | 4 | 3.5 | 3 | 3.5 |
| 5 | 3.5 | 4 | 4 | 4 | 3.5 | 3.5 | 3.5 |
| 6 | 3.5 | 4 | 4 | 4 | 3.5 | 3.5 | 3.5 |
| 7 | 3.5 | 4 | 4 | 4 | 3.5 | 3.5 | 3.5 |

TABLE 2-continued

Represents Beading before and after UV exposure
(1 = Excellent and 5 = Bad)

| Example | Beading 0 | QUV 300 | 1000 | 1500 | 2500 | 3000 | 4000 |
|---|---|---|---|---|---|---|---|
| 8 | 3.5 | 4 | 4 | 4 | 3.5 | 3.5 | 4 |
| 9 | 3 | 4 | 4 | 3.5 | 3 | 3.5 | 4 |
| 10 | 3.5 | 4 | 4 | 3.5 | 3.5 | 3.5 | 4 |
| 11 | 4 | 3.5 | 4 | 4 | 3.5 | 3.5 | 4 |
| 12 | 4 | 2 | 2 | 2.5 | 2.5 | 2 | 3.5 |
| 13 | 2.5 | 2.5 | 2.5 | 3 | 2.5 | 2 | 3.5 |
| 14 | 2.5 | 2 | 2.5 | 3 | 2.5 | 2 | 3 |
| 15 | | | | | | | |
| 16 | 2.5 | 2 | 3 | 2.5 | 2.5 | 2 | 3 |
| 17 | | | | | | | |
| 18 | 2.5 | 2.5 | 2.5 | 2.5 | 2 | 2 | 3 |
| 19 | 2.5 | 2 | 2.5 | 2.5 | 2 | 2 | 3.5 |
| 20 | | | | | | | |
| 21 | | | | | | | |
| 22 | | | | | | | |
| 23 | 2 | 2.5 | 2.5 | 2.5 | 2 | 2 | 3 |
| Untreated Wood | 5 | | | | | | |
| Wax emulsion 5% | | | | | | | |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A water repellant coating composition comprising:
polybutene;
polysiloxane;
an emulsifier; and
water, wherein the polybutene is present in an amount of 10 to 70 weight percent, based on the total weight of the composition, the polysiloxane is present in an amount of 3.5 to 40 weight percent, based on the total weight of the composition, the emulsifier is present in an amount of 0.5 to 15 weight percent, based on the total weight of the composition, and the water is present in an amount of 15 to 80 weight percent, based on the total weight of the composition, and wherein the polysiloxane comprises

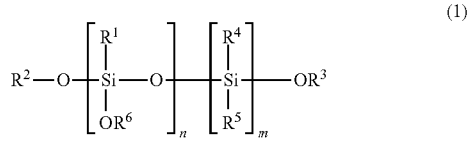

(1)

wherein each $R^1$, $R^4$, and $R^5$ may be identical or different and are independently selected from the group comprising alkyl, aryl, aminoalkyl, mercaptoalkyl, glycidyl ether alkyl, and hydrogen radicals, $R^2$, $R^3$, and $R^6$ may be identical or different and are selected each independently from the group comprising hydrogen, alkyl and aryl radicals, and m and n is selected so that the molecular weight for the polysiloxane is in the range of from 200 to 600,000, and the composition has a VOC of less than 50 g/liter.

2. The composition of claim 1 wherein the polybutene is present in an amount of 25 to 45 weight percent, based on the total weight of the composition, the polysiloxane is present in an amount of 7.5 to 20 weight percent, based on the total weight of the composition, the emulsifier is present in an amount of 1 to 7.5 weight percent, based on the total weight of the composition, and the water is present in an amount of 35 to 60 weight percent, based on the total weight of the composition.

3. The composition of claim 1 wherein the molecular weight of the polysiloxane is in the range of 500 to 6,000.

4. The composition of claim 1 wherein the molecular weight of the polysiloxane is in the range of 750 to 2,200.

5. The composition of claim 1 wherein the polybutene is present in an amount of 25 to 45 weight percent, based on the total weight of the composition, the polysiloxane is present in an amount of 7.5 to 20 weight percent, based on the total weight of the composition, the emulsifier comprises a fatty acid and triethanol amine, and the composition is devoid of wax.

6. The composition of claim 1 wherein the polybutene is present in an amount of 25 to 45 weight percent, based on the total weight of the composition, the polysilane is present in an amount of 7.5 to 20 weight percent, based on the total weight of the composition, the emulsifier is present in an amount of 1 to 7.5 weight percent, based on the total weight of the composition, and the water is present in an amount of 35 to 60 weight percent, based on the total weight of the composition.

7. The composition of claim 1 wherein the polysiloxane has an alkoxy content of at least 0.25 weight percent and no more than 25 weight percent.

8. The composition of claim 7 wherein the polysiloxane comprises a silicone comprising 10 to 100 percent phenyl silane and 0 to 90 percent dimethyl silane.

9. The composition of claim 7 wherein the polysiloxane has an alkoxy content of 3 to 25 weight percent.

10. The composition of claim 7 wherein the polysiloxane has an alkoxy content of 7.5 to 19.5 weight percent and a silanol content of 3 to 25 weight percent.

11. A water repellant coating composition comprising:
polybutene;
polysiloxane;
an emulsifier; and
water, wherein the organic polymer is present in an amount of 10 to 70 weight percent, based on the total weight of the composition, the polysiloxane is present in an amount of 3.5 to 40 weight percent, based on the total weight of the composition, the emulsifier is present in an amount of 0.5 to 15 weight percent, based on the total weight of the composition, and the water is present in an amount of 15 to 80 weight percent, based on the total weight of the composition, wherein the polysiloxane has a functionality of 7.5 to 17.5 weight percent, and the composition has a VOC of less than 50 g/liter.

12. The composition of claim 11 wherein the molecular weight of the polysiloxane is in the range of 750 to 2,200, the emulsifier comprises oleic acid, and the composition further comprises triethanol amine.

13. The composition of claim 11 wherein the polysiloxane comprises

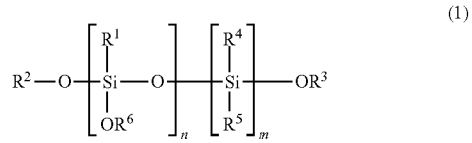

(1)

wherein each $R^1$, $R^4$, and $R^5$ may be identical or different and are independently selected from the group comprising alkyl, aryl, aminoalkyl, mercaptoalkyl, glycidyl ether alkyl, and hydrogen radicals, $R^2$, $R^3$, and $R^6$ may be identical or different and are selected each independently from the group comprising hydrogen, alkyl and aryl radicals, and m and n is selected so that the molecular weight for the polysiloxane is in the range of from 200 to 600,000 and the polysiloxane has an alkoxy content of at least 0.25 weight percent and no more than 25 weight percent.

14. The composition of claim 13 wherein the polysiloxane comprises a silicone comprising 10 to 100 phenyl silane and 0 to 90 percent dimethyl silane.

15. The composition of claim 14 wherein the silicone comprises about 60% phenylsilane and about 40% dimethyl silane.

16. The composition of claim 14 wherein the polysiloxane comprises a silicone comprising 10 to 80 phenyl silane and 20 to 90 percent dimethyl silane.

17. A water repellant coating composition consisting essentially of:
polybutene;
polysiloxane;
an emulsifier; and
water, wherein the polybutene has a number average molecular weight of 900 to 3,000 and is present in an amount of 10 to 70 weight percent, based on the total weight of the composition, the polysiloxane is present in an amount of 3.5 to 40 weight percent, based on the total weight of the composition, the emulsifier is present in an amount of 0.5 to 15 weight percent, based on the total weight of the composition, and the water is present in an amount of 15 to 80 weight percent, based on the total weight of the composition, and wherein the polysiloxane comprises a polysiloxane having a dimethyl content of 20 to 50 weight percent, a functionality of 3 to 25 weight percent, and a molecular weight of 500 to 6,000.

18. The composition of claim 17, wherein the emulsifier comprises oleic acid and triethanol amine, and the composition has a VOC of less than 50 g/liter.

19. A water repellant coating composition comprising:
polybutene;
polysiloxane;
wax;
an emulsifier; and
water, wherein the polybutene has a number average molecular weight of 900 to 3,000 and is present in an amount of 10 to 70 weight percent, based on the total weight of the composition, the polysiloxane is present in an amount of 3.5 to 40 weight percent, based on the total weight of the composition, the emulsifier is present in an amount of 0.5 to 15 weight percent, based on the total weight of the composition, and the water is present in an amount of 15 to 80 weight percent, based on the total weight of the composition, and wherein the polysiloxane comprises a polysiloxane having a dimethyl content of 20 to 50 weight percent, a functionality of 3 to 25 weight percent, and a molecular weight of 500 to 6,000, and the composition has a VOC of less than 50 g/liter.

* * * * *